2,761,853

PROCESS FOR PRODUCTION OF LOW VISCOSITY HIGH SOLIDS LATEX

Carl A. Uraneck, Phillips, and Richard J. Sonnenfeld, Borger, Tex., assignors to Phillips Petroleum Company, a corporation of Delaware No Drawing. Application September 27, 1951, Serial No. 248,644

7 Claims. (Cl. 260—29.7)

This invention relates to the polymerization of unsaturated organic compounds capable of undergoing an addition polymerization to form high molecular weight polymers. In one of its specific aspects it relates to the polymerization of aliphatic conjugated diene hydrocarbons alone or in admixture with a monomer copolymerizable therewith to form long chain polymers of the type known as synthetic rubbers.

In the rubber industry it is well known that latex is generally shipped as a concentrate, ordinarily containing about sixty to sixty-five per cent solids, since this eliminates the shipping of excess water originally present in the latex. Moreover, latices of high solids content have become increasingly important, particularly for the production of foam sponge. Natural rubber has been very suitable for use in applications where a high solids latex is essential. It can be readily concentrated either by centrifuging or by creaming processes because natural rubber has a large particle size. However, synthetic rubber latex has a very small particle size which makes concentration more difficult and costly. In creaming operations a significant amount of synthetic polymer is usually lost in the serum.

In the production of high solids latices by emulsion polymerization recipes in which less water is used than that normally employed, numerous difficulties have been encountered. In many instances the reaction rate is rapid at first but tends to die before the solids content reaches the desired level. The rapid polymerization rates in the early stages of the reaction make temperature control difficult. Another factor which makes temperature control difficult is that the viscosity of the reaction mixture often becomes very high and in some instances results in gelation of the latex.

An object of this invention is to provide an efficient and convenient process for the production of latices of high solids content. Another object of the present invention is to provide an emulsion polymerization process for the production of low viscosity high solids latex. Still another object of the instant invention is to provide a low viscosity high solids latex particularly suited for the production of foam sponge. A further object of this invention is to provide an improved process for the polymerization of aliphatic conjugated diene hydrocarbons. A still further object is to provide an improved process for the copolymerization of a butadiene hydrocarbon and a monomer copolymerizable therewith in a homogeneous system. Further objects and advantages of this invention will become apparent to one skilled in the art from the accompanying disclosure and discussion.

We have now discovered an emulsion polymerization process whereby high solids latices of low viscosity can be obtained. In preparing high solids latex in accordance with this invention the problem is to produce a fluid, easy to handle high solids latex, a problem not present in high water content latex. A much smaller quantity of aqueous phase is used than is employed in conventional polymerization recipes, the ratio of aqueous phase to monomers being in the range of from 0.8:1 to 0.15:1 or less. It is our discovery that low viscosity high solids latex can be prepared in an aqueous emulsion system in which from 15 to 80 parts by weight of water based on 100 parts by weight of monomeric material are employed, by initially polymerizing a minor amount of the total monomeric material to a conversion of at least twenty-five per cent but not exceeding seventy-five per cent in the presence of substantially all of the water for the aqueous phase, and a sufficient amount of the initiator, activator and modifier to obtain said conversion, and then adding to the initial emulsion system the remaining ingredients comprising monomeric material, initiator, activator and modifier.

When operating according to the process of this invention it is generally preferred to charge at least ten per cent of the monomers initially. In any event the maximum amount of monomers present in the initial charge should not exceed fifty per cent of the total monomers. Sufficient time is allowed for polymerization to proceed to at least twenty-five per cent conversion and preferably around forty to sixty per cent conversion before more monomers are added. The remaining monomers can then be charged all at once or in several increments usually equally spaced until the full charge has been added. If desired, the remaining monomers can be added continuously as the polymerization proceeds. If polymerization is allowed to continue above sixty per cent conversion before the addition of more of the monomers, there is a tendency for precoagulation to occur. The tendency is toward increased precoagulation as the conversion is increased, particularly over seventy-five per cent. In order to insure adequate temperature control, it is preferred to add initially only those quantities of activator, initiator, and modifier ingredients necessary to effect polymerization at the desired rate. The remaining quantities of these ingredients can then be introduced portionwise during the polymerization at such intervals and in such quantities to promote the polymerization at a satisfactory rate. Increments can be added when the monomer conversion is in the range between twenty-five and sixty per cent based on the total amount of monomers charged to the polymerization system prior to the time the increment is introduced. It is understood that when several increments are added some time is allowed for polymerization between the increments. Generally the polymerization is conducted in the presence of a sufficient excess of monomeric material so that there is no decrease in the polymerization rate. The remaining quantities of the ingredients are then introduced portionwise during the polymerization at such intervals and in such quantities to promote the polymerization at a satisfactory rate. Besides providing for good temperature control, the reaction occurs at a more uniform rate when operating in this manner.

In the preparation of high solids latex by processes known heretofore when the activator and other ingredients are all charged initially, the polymerization rate at the beginning of the reaction is very rapid and temperature control is difficult. In the practice of our invention a process in which temperature can be readily controlled is provided for the production of high solids latex by emulsion polymerization of a monomeric material comprising a major amount of a butadiene hydrocarbon and a minor amount of styrene. Our improvement comprises at a temperature of from −40° C. to 70° C. and in an aqueous emulsion system in which from fifteen to eighty parts by weight of water based on 100 parts by weight of monomeric material are employed, initially polymerizing from ten per cent to fifty per cent by weight of the monomeric material to a conversion of from forty per cent to sixty per cent in the presence of all of the water for the total aqueous phase except sufficient to dissolve water-soluble salts to be subsequently added, a sufficient amount of the initiator, activator and modifier to obtain said conversion, then adding to the initial emulsion system the remaining ingredients comprising monomeric material, initiator, activator and modifier, and continuing the polymerization to a conversion of at least seventy-five per cent based on the total monomeric material.

The process of this invention is effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Included in the class of monomers are the conjugated butadienes. We prefer conjugated diolefins having from four to six carbon atoms, for example 1,3-butadienes such as butadiene (1,3-butadiene), 2,3-dimethyl-1,3-butadiene, isoprene, piperylene, 3-methoxy-1,3-butadiene and the like. Other olefins are haloprenes, such as chloroprene (2-chloro-1,3-butadiene), bromoprene, methylchloroprene (2-chloro-3-methyl-1,3-butadiene), and the like. Olefins copolymerizable with the conjugated diolefins are for example, styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alphachloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With those specific monomers, it is usually preferred to use them together, in relative ratios of butadiene to styrene between 65:35 and 90:10 by weight. However the ratio of butadiene to styrene can be between 35:65 and 95:5 by weight.

The process of this invention is not limited to any particular initiator-activator system, but, for example, can be employed effectively in hydroperoxide-iron complex systems, hydroperoxide-polyamine systems and in diazothioether systems. The amounts of activator and catalyst ingredients employed in each stage of the polymerization will vary depending upon the type and amounts of monomers used, and other reaction variables. Since a minor amount of monomeric material is used for the initial charge, usually less than 50 percent of the activator and catalyst ingredients are charged at this time.

In accordance with this invention temperatures may range from about −40° C. to about 70° C. with temperatures from about −20° C. to about +50° C. usually preferred. Obviously when polymerizations are carried out in aqueous emulsion in the absence of freezing point depressants, temperatures below the freezing point of water cannot be employed. The use of various additive agents, however, makes a process of the type disclosed herein applicable at lower temperatures, and, in fact, this is one of the distinct advantages of the present invention. Inorganic salts and alcohols can be used for lowering the freezing point. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. When higher temperatures are employed, say up to about 50° C., some variations are usually introduced into the recipes. For example, in ferricyanide - diazo thioether - mercaptan recipes, the amount of ferricyanide is generally decreased as the temperature is increased.

The modifier in each recipe is preferably an alkyl mercaptan, and may be primary, secondary, or tertiary configuration, and generally ranges from $C_8$ to $C_{16}$ compounds, but may have more or fewer carbon atoms per molecule. Mixture or blends of these mercaptans are also frequently desirable and in many cases may be preferred to the pure compounds. The amount of modifier necessary to yield a polymer having an uncompounded Mooney viscosity within the desired range will vary depending, among other things, upon the particular recipe being used and upon the modifier (either pure mercaptan or a blend of several mercaptans) present in the recipe. The determination of the necessary amount of modifier in each case is within the skill of the art and is generally in the range of 0.2 part to 3 parts modifier per 100 parts by weight of monomers. In general, less modifier is needed to obtain the desired Mooney viscosity in the case of lower molecular weight mercaptans than with higher molecular weight mercaptans. Other modification agents known to the art, for example, dialkyl dixanthogens, diaryl mono- and di-sulfides, tetra-alkyl thiuram mono- and di-sulfides, and mercaptothiazoles, can also be used to advantage in the process of our invention.

Emulsifying agents suitable for use in the practice of our invention include fatty acid soaps, e. g., potassium laurate, and potassium oleate, rosin acid soaps, and mixtures of fatty acid and rosin acid soaps. However other emulsifying agents, such as non-ionic emulsifying agents, salts of alkyl aromatic sulfonic acids, alkyl sulfates, and the like which produce favorable results under the conditions of the reaction, can also be used in practicing our invention, either alone or in admixture with soaps. The amount and kind of emulsifier used to obtain optimum results is somewhat dependent upon the particular recipe being used, the relative amounts of monomeric material and aqueous phase, and like variables. Usually an amount between about 0.3 and 5 parts per 100 parts by weight of monomers will be found to be sufficient, determination of the best amount for any given recipe being within the skill of the art. Throughout this disclosure when "parts" are given, parts by weight based on 100 parts monomers are intended. When the amount is expressed in millimols per 100 parts of monomeric material the same units of weight throughout are used, i. e., when the monomeric material is in pounds the other material will be in millipound mols.

Suitable hydroperoxides for use in iron pyrophosphate (redox) and polyalkylene polyamine recipes and other recipes calling for an oxidant are preferably organic hydroperoxides having the formula RR'R"COOH wherein each of R, R', and R" is an organic radical, or R'R" together comprise a tetramethylene or pentamethylene group forming with

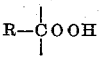

a cyclopentyl or cyclohexylhydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e., mercapto compounds and thioethers), and halogen compounds. Examples of such hydroperoxides include diisopropyl hydroperoxide (isopropyl(dimethyl)hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl(ethoxyphenyl)hydroperoxymethane, methyldecyl(methylphenyl)hydroperoxymethane, dimethyldecylhydroperoxymethane, methylchlorophenylphenylhydroperoxymethane, and tertiarybutylisopropylbenzene hydroperoxide (dimethyl(tertiary-butylphenyl)hydroperoxymethane).

Such hydroperoxides can be easily prepared by simple oxidation, with free oxygen, of the corresponding hydrocarbon or hydrocarbon derivative, i. e., of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compound may be stripped and the residual material employed. The major active ingredient in such a composition is the monohydroperoxide, or a mixture of monohydroperoxides. The hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of diisopropylbenzene the primary product appears to be dimethyl(isopyropylphenyl)hydroperoxymethane.

One large group of these hydroperoxymethanes is that group in which each of the three substituent groups is a hydrocarbon radical. One of the subgroups of these compounds is the alkaryldialykyl hydroperoxymethanes, in which the two alkyl groups are relatively short, i. e., have from one to three or four carbon atoms each, including dimethyl(teritiary-butylphenyl)hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, and corresponding methylethyl and diethyl compounds, and the like. Another subgroup includes at least one long alkyl group directly attached to the hydroperoxymethane, such as methyldecyl(methylphenyl)hydroperoxymethane, ethyldecylphenylhydroperoxymethane, and the like. Still another subgroup includes trialkyl compounds, such as dimethyldecylhydroperoxymethane, and the like; aralkyl compounds such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexane, methylcyclopentane, and phenylcyclohexane, and compounds containing condensed ring structures such as 1,2,3,4,4a,9,10,10a-octahydrophenanthrene, which forms the corresponding hydroperoxide upon oxidation, etc. The organic hydroperoxides preferably will have a total of not more than thirty carbon atoms per molecule, and the most active hydroperoxides usually have at least ten to twelve carbon atoms per molecule. Mixtures of these hydroperoxides can be used, as desired.

The amount of organic hydroperoxide used to obtain an optimum reaction rate will depend upon the polymerization recipe employed and upon the specific reaction conditions. The amount is generally expressed in millimols per 100 parts of monomers, using in each instance the same units of weight throughout, i. e., when the monomeric material is measured in pounds the hydroperoxide is measured in millipound mols. The same is true for other ingredients in the polymerization recipe. The optimum rate of polymerization is usually obtained with the amount of hydroperoxide between 0.01 and 10 millimols per 100 parts by weight of monomers.

The diazo thioethers of the present invention have the general structural formula R—N=N—S—R' wherein R is a member of the group consisting of aromatic and substituted aromatic radicals and R' is a member of the group consisting of aromatic, substituted aromatic, cycloalkyl, substituted cycloalkyl, aliphatic, and substituted aliphatic radicals. Desirable substituents are alkyl, chloro, nitro, methoxy, sulfo, and the like. Among prefered compounds are those more fully described in the patent to Reynolds and Cotton, U. S. Patent No. 2,501,692, granted March 28, 1950. These compounds act both as initiators and as modifiers in a polymerization recipe and hence may be used as both catalysts and modifiers in the recipe. However it is preferred to use a modifier of the type noted above along with the diazothioether in the practice of our invention. In certain instances, it may also be desirable to use a catalyst such as potassium or sodium ferricyanide in conjunction with the diazothioether. Examples of suitable diazothioethers include 2 - (2,4 - dimethylbenzenediazomercapto)naphthalene, 2-(4-methoxybenzenediazomercapto)naphthalene (known in the art as MDN), 2-(2-methylbenzenediazomercapto)naphthalene, 2 - (2,5 - dimethoxybenzenediazomercapto)naphthalene, 4 - (2,5 - dimethoxybenzenediazomercapto)toluene, 4 - (2 - naphthalenediazomercapto)anisole, 2 - (4 - acetylaminobenzenediazomercapto)-naphthalene, 2 - (benzenediazomercapto)naphthalene, 2-(4-sulfobenzenediazomercapto)benzothiazole, 2 - (1 - naphthalenediazomercapto)naphthalene, 2-(4-chlorobenzenediazomercapto)naphthalene, 2 - (5 - quinolinediazomercapto)naphthalene, 2 - (4 - nitrobenzenediazomercapto)-naphthalene, and the like.

The type and amount of diazothioether used in a particular polymerization recipe depends upon the result desired. In general, approximately 0.2 part by weight of diazothioether per 100 parts of butadiene will give satisfactory promotion of the polymerization reaction although other proportions within the rang of about 0.5 to about 5.0 parts by weight per 100 parts by weight of monomers, can be used. The diazothioether can be added in increments throughout the polymerization reaction in order to provide more uniform modification and to obtain more efficient utilization of the diazothioether. If the diazothioether is used alone to modify the polymer, somewhat larger quantities are needed than is the case if other modifiers are used in conjunction therewith.

In the case of an iron pyrophosphate (redox) recipe, the presence of a sugar or similar reducing agent is optional. Suitable reducing agents (also known as activating agents) include fructose, dextrose, sucrose, benzoin, acetylacetone, ascorbic acid, sorbitol, benzaldehyde, and the like.

When a ferrous pyrophosphate activator is used in an iron pyrophosphate (redox) recipe, it is preferably prepared by admixing a ferrous salt, such as ferrous sulfate, with a pyrophosphate of an alkali metal, such as sodium or potassium, with water and heating this mixture, preferably for the length of time required for maximum activity. A reaction occurs between the salts, as evidenced by the formation of a grayish-green precipitate. When preparing the activator the mixture is generally heated above 122° F., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 140° F. for a period of heating ranging from 10 to 30 minutes. Prior to heating the activator mixture the vessel is usually flushed with an inert gas such as nitrogen. In general it is preferred to heat the mixture below the boiling point, say at a temperature around 130° to 165° F.

Where the activator is prepared just prior to use it is generally employed in the form of an aqueous dispersion. Since activators and initiators are added in two stages, two portions of the activator in aqueous dispersion will be used. However, the solid activator may be isolated and the crystalline product used, and it is preferred in this form in some instances. Subsequent to heating the activator mixture, it is cooled to about room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the monomers. This crystalline material is believed to be a sodium ferrous pyrophosphate complex, such as might be exemplified by the formula $2Na_2FeP_2O_7 \cdot Na_2P_2O_7$, or perhaps

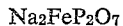

$Na_2FeP_2O_7$

In any event the complex, whatever its composition, is one active form of ferrous iron and pyrophosphate which can be successfully used in our invention. It can be incorporated in the polymerization mixture as such, or can be dispersed in water. Other forms of multivalent metal, e. g., copper, and pyrophosphate may also be used, so long as there is present in the reacting mixture a soluble form of a multivalent metal, capable of existing in two valence states and present primarily in the lower of two valence states, and a pyrophosphate.

The amounts of activator ingredients to be charged in an iron pyrophosphate recipe are usually expressed in terms of monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however the narrower range of 0.2 to 2.5 millimols is more frequently preferred. The mol ratio of ferrous salt to alkali metal pyrophosphate can be between 1 to 0.2 and 1 to 3.5 with a preferred ratio between 1 to 0.35 and 1 to 2.8.

In the case of a polyalkylene polyamine recipe, the activating agent, i. e., a polyalkylene polyamine is preferably a polyethylene polyamine or a trimethylene polyamine. Suitable polyethylene polyamines have the general formula $$RNH(CHXCHXNH)_m(CHXCHX)_nNHR$$

where R contains not more than eight carbon atoms and is of the group consisting of hydrogen, alkyl, cycloalkyl, aromatic, olefinic, and cycloolefinic radicals, each X contains not more than three carbon atoms and is of the group consisting of hydrogen, and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i. e., mercapto compounds and thioethers), and halogen compounds. Examples of such polyamines include ethylenediamine, hydrazine, diethylenetriamine, tetraethylenepentamine, dipropylenetriamine, 2-methyl-3-azapentane-1,5-diamine, N-(2-hydroxy-ethyl)-1,2-ethanediamine, N-phenylethylenediamine, N-cyclohexyl-N'-(2-aminoethyl)-1,2-ethanediamine, N-(2-hydroxy-tertiary-butyl)-1,2-propylene diamine, carbamates of the foregoing and the like.

Suitable trimethylene polyamines are preferably those having the general formula

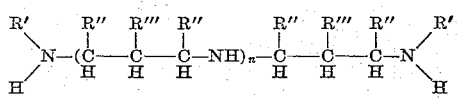

where each R' is one of the group consisting of hydrogen, methyl, ethyl, hydroxymethyl, hydroxyethyl, and carboxy radicals, each R" is hydrogen or methyl, and each R''' is hydrogen, methyl, or an activating substituent of the group consisting of —OR, —SR, —NR$_2$, —CN, —SCN, —COOR, —CHO, with R being hydrogen methyl, ethyl, n-propyl, or isopropyl, or —CHR''' can be >C=O, and $n$ is an integer between 0 and 8 inclusive. The compounds containing a single trimethylene group together with its two terminal amine groups is preferred. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compound, can also be employed; for example tri(trimethylene)tetramine (sometimes erroneously designated as tripropylenetetramine) is considered to be a polymer of trimethylenediamine. All of the polyamino compounds referred to above have the basic structure of 1,3-diaminopropane and hence can be broadly referred to as "1,3-diaminopropane and its derivatives and polymers thereof"; they can also be broadly referred to as "1,3-diaminopropanes" and also as "trimethylene polyamines." It is preferred to use only those polyamines which come within the structural formula defined hereinabove, and all of the compounds so defined are operable in our process to some extent though it will of course be appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by way of example the following are mentioned: 1,3-diaminopropane, 1,3-diaminoacetone, 1,3-diamino-2-propanol, N,N'-dimethyl-1,3-diaminoacetone, N-ethoxy-1,3-diamino-2-propanol, 1,3-diamino-2-carboxypropane, 1,3-diamino-2-(dimethylamino)-propane, 2,4-diaminopentane, 1,3-diamino-2-cyanopropane, 1,3 - diamino - 2 - mercaptopropane, di(trimethylene)triamine, tri(trimethylene)tetramine, tetra(trimethylene)pentamine, polytrimethylene polyamines in which the amino and trimethylene groups can be substituted as previously mentioned, and carbamates of each of the foregoing.

These polyalkylene polyamine activator compositions appear to serve as reductants and/or activators in the polymerization mixture, and no other activating ingredients, such as compounds of polyvalent-multivalent metals, need be added in order to obtain satisfactory and rapid polymerization of the monomers, except as such compounds may fortuitously be present as traces in the polymerization mixture. Similarly, no other reducing ingredient, such as a reducing sugar, need be added.

The amount of polyalkylene polyamine to be used in any particular case depends upon such variables as the polyamine used, specific ingredients of recipe, and conditions of reaction. In general, amounts of polyalkylene polyamine in the range of 0.1 to 2 parts of polyalkylene polyamine per 100 parts of monomers will give satisfactory results; however greater or smaller amounts of polyamine can be used.

The following example shows in more detail one preferred embodiment of our invention. The example is for the purposes of illustration and should not be construed as unduly limiting to the scope of the invention.

EXAMPLE

A series of polymerization runs was made for the preparation of butadiene-styrene copolymers at 5° C. In one run portions of monomers, hydroperoxide, and iron pyrophosphate activator were introduced during the polymerization in accordance with this invention (run 1). In the control runs (runs 2 and 3) all monomers were charged initially with iron pyrophosphate activator and hydroperoxide being added at intervals during the polymerization. Details of the charging procedure and results obtained are shown in the following table and are described further in the discussion which follows the table. The materials are all given in parts by weight.

introduced in eight equal increments every four hours starting at approximately four hours. The remaining 50 parts of the butadiene-styrene mixture was added at an average rate of 2.75 parts per hour. The addition of this portion of monomers was started when the monomers in the original charge had polymerized to approximately 50 per cent conversion (26 per cent solids). Polymerization temperature was increased to 10° C. at 29 hours (43 per cent solids) and the reaction continued to 53.7 per cent solids (87.7 per cent conversion). The latex was fluid and contained no precoagulum. One part of potassium fatty acid soap was added to the latex, the unreacted monomers were stripped, and the latex was concentrated to 58.3 per cent solids.

With reference to the control runs, in run 2 additional quantities of hydroperoxide, ferrous sulfate, and potassium pyrophosphate were introduced at two different intervals during the polymerization. In run 3, three separate portions of hydroperoxide were introduced but only one portion of activator solution ($FeSO_4.7H_2O$-$K_4P_2O_7$ mixture) was added after the start of the reaction as shown in the table. Although latices in both runs contained no precoagulum, the latices in these runs had a much higher viscosity than the latex in run 1 in spite of the fact that run 3 was carried to a lower conversion and had a lower solids content than the other runs. In run 1 made in accordance with the instant invention the viscosity of the resulting latex was 650 centipoises. On the other hand the two control runs in which all of the monomeric material was added initially resulted in latices having viscosities of 3300 centipoises and 1260 centipoises.

It can be readily seen that while heretofore numerous difficulties have been encountered in the production of synthetic high solids latex this invention affords a novel and convenient method for preparing such latices. It is apparent from the above table that when operating in accordance with this invention a pronounced improvement in fluidity, or latex viscosity, can be obtained. Modifications and variations will occur to those skilled in the art and can be made without departing from the spirit and scope of this invention.

Table

|  | Run 1 | | | Run 2 | | | | Run 3 | | | |
| --- | --- | --- | --- | --- | --- | --- | --- | --- | --- | --- | --- |
|  | Initial Charge | Added During Polymerization | Total Charge | Initial Charge | Added at— | | Total Charge | Initial Charge | Added at— | | | Total Charge |
|  |  |  |  |  | 2.5 Hrs. | 12 Hrs. |  |  | 3 Hrs. | 7.8 Hrs. | 16.4 Hrs. |  |
| Water | 54 | 13 | 67 | 64.5 | 3 | 2.5 | 70 | 66.25 |  | 3.75 |  | 70 |
| Butadiene | 35 | 35 | 70 | 70 |  |  | 70 | 70 |  |  |  | 70 |
| Styrene | 15 | 15 | 30 | 30 |  |  | 30 | 30 |  |  |  | 30 |
| Fatty Acid soap, K salt | 3 |  | 3 | 3 |  |  | 3 | 3 |  |  |  | 3 |
| Daxad 12K [1] | 0.5 |  | 0.5 | 0.5 |  |  | 0.5 | 0.5 |  |  |  | 0.5 |
| KOH | 0.05 |  | 0.05 | 0.05 |  |  | 0.05 | 0.05 |  |  |  | 0.05 |
| Mercaptan blend [2] | 0.27 |  | 0.27 | 0.27 |  |  | 0.27 | 0.27 |  |  |  | 0.27 |
| Tert-butylisopropylbenzene hydroperoxide | 0.025 | 0.162 | 0.187 | 0.05 | 0.074 | 0.062 | 0.186 | 0.05 | 0.044 | 0.05 | 0.044 | 0.188 |
| $K_4P_2O_7$ | 0.035 | 0.23 | 0.265 | 0.07 | 0.106 | 0.088 | 0.264 | 0.133 |  | 0.133 |  | 0.266 |
| $FeSO_4.7H_2O$ | 0.028 | 0.182 | 0.21 | 0.056 | 0.084 | 0.070 | 0.21 | 0.105 |  | 0.105 |  | 0.21 |
| KCl | 0.5 |  | 0.5 | 0.6 |  |  | 0.6 | 0.6 |  |  |  | 0.6 |
| Reaction time, hours |  |  | 41 |  | 2.5 | 12 | 44 |  | 3 | 7.8 | 16.4 | 24.2 |
| Solids, Percent |  |  | 53.7 |  | 16.5 | 36 | 56.8 |  | 21.9 | 30.8 | 46 | 49.2 |
| Conversion, Percent |  |  | 87.7 |  | 23.4 | 57.3 | 94.7 |  | 32.7 | 48.3 | 75.7 | 79.4 |
| Latex Properties: |  |  |  |  |  |  |  |  |  |  |  |  |
| Solids, Percent after stripping |  |  | 58.3 |  |  |  | 58.2 |  |  |  |  | 55.1 |
| Viscosity, centipoises |  |  | 650 |  |  |  | 3,300 |  |  |  |  | 1,260 |
| Mooney value, ML–4 |  |  | 92 |  |  |  | 89 |  |  |  |  | 74 |

[1] Potassium salt of condensed alkyl aryl sulfonic acid.
[2] A blend of tertiary $C_{12}$, $C_{14}$, and $C_{16}$ aliphatic mercaptans in a ratio of 3:1:1 parts by weight.

As shown in the table, in run 1 made according to our invention the initial charge contained 50 parts of monomers and a portion of the iron-pyrophosphate activator and catalyst. A mixture containing 13 parts water, 0.23 part $K_4P_2O_7$, and 0.182 part $FeSO_4.7H_2O$ was prepared and 1.67 parts of this mixture added to the polymerization system every four hours starting at approximately four hours. Additional hydroperoxide (0.162 part) was

We claim:

1. A method for producing a low viscosity, high solids latex which comprises forming an emulsion of water and a monomeric material in the proportion of 15 to 80 parts by weight of water based on 100 parts by weight of said monomeric material, said monomeric material comprising an aliphatic conjugated diene, polymerizing a minor amount of said total monomeric material to a conversion in the range of 25 to 75 per cent in the presence of substantially all of said water and a sufficient amount of an initiator, activator and modifier to obtain said conversion, and then adding to said emulsion the remainder of said monomer material and sufficient initiator, activator and modifier and continuing said polymerization to obtain a conversion of at least 75 per cent based on said total monomeric material, the composition of said monomeric material initially and subsequently charged to said emulsion system being constant throughout the process.

2. A method for producing a low viscosity, high solids latex which comprises forming an emulsion of water and a monomeric material in the proportion of 15 to 80 parts by weight of water based on 100 parts by weight of said monomeric material, said monomeric material comprising a major amount of an aliphatic conjugated diene and a minor amount of a compound polymerizable therewith which contains a $CH_2=C<$ group, polymerizing from 10 to 50 per cent by weight of said total monomeric material to a conversion in the range of 25 to 75 per cent in the presence of all of the water for the total aqueous phase except sufficient water to dissolve water-soluble salts to be subsequently added and a sufficient amount of an initiator, activator, and modifier to obtain said conversion, and then adding to said emulsion the remainder of said monomer material and sufficient initiator, activator and modifier and continuing said polymerization to obtain a conversion of at least 75 per cent based on said total monomeric material, the composition of said monomeric material initially and subsequently charged to said emulsion system being constant throughout the process.

3. A method for producing a low viscosity, high solids latex which comprises forming an emulsion of water and monomeric material in the proportion of 15 to 80 parts by weight of water based on 100 parts by weight of said monomeric material, said monomeric material comprising a major amount of a butadiene hydrocarbon and a minor amount of styrene, polymerizing from 10 to 50 per cent by weight of said total monomeric material to a conversion of from 25 to 75 per cent in the presence of all of the water for the total aqueous phase except sufficient water to dissolve water-soluble salts to be subsequently added and a sufficient amount of an initiator, activator and modifier to obtain said conversion, and then adding to said emulsion the remainder of said monomeric material and sufficient initiator, activator and modifier and continuing said polymerization to obtain a conversion of at least 75 per cent based on said total monomeric material, the composition of said monomeric material initially and subsequently charged to said emulsion system being constant throughout the process.

4. The method of claim 3 wherein the said monomeric material initially charged to the emulsion system is polymerized to about 40 to 60 per cent conversion.

5. The method of claim 4 wherein said polymerization is conducted at a temperature in the range of $-40°$ C. to $70°$ C.

6. A method for producing a low viscosity, high solids latex which comprises forming an emulsion of water and monomeric material in the proportion of 15 to 80 parts by weight of water based on 100 parts by weight of said monomeric material, said monomeric material comprising a major amount of butadiene hydrocarbon and a minor amount of styrene, polymerizing from 10 to 50 per cent by weight of said total monomeric material to a conversion of from 25 to 75 per cent in the presence of all the water for the total aqueous phase except sufficient water to dissolve water soluble salts to be subsequently added and a sufficient amount of initiator, activator and modifier to obtain said conversion, during the course of the reaction adding to the reaction mixture a plurality of increments of the remaining ingredients comprising said monomeric material, initiator, activator and modifier, the amount of each increment being such that there is no decrease in the polymerization rate, and polymerizing said monomeric material to at least 75 per cent conversion based on said total monomeric material, the composition of said monomeric material initially and subsequently charged to said emulsion system being constant throughout the process.

7. The method according to claim 6 wherein the said polymerization is conducted at a temperature in the range of $-40°$ C. to $70°$ C. and wherein the said monomeric material initially charged to the emulsion system is polymerized to about 40 to 60 per cent conversion.

References Cited in the file of this patent

UNITED STATES PATENTS

| 2,418,782 | Mark et al. | Apr. 8, 1947 |
| 2,460,300 | Le Fevre et al. | Feb. 1, 1949 |
| 2,537,334 | De Nie | Jan. 9, 1951 |
| 2,579,908 | Davison et al. | Dec. 25, 1951 |

FOREIGN PATENTS

| 304,207 | Great Britain | Apr. 15, 1930 |

OTHER REFERENCES

Borders et al.: Ind. and Eng. Chem., vol. 40, No. 8, August 1948, pages 1473–1477.